SIGNAL TRANSMITTING AND RECEIVING SYSTEM

Filed April 21, 1959

United States Patent Office 3,427,617

Patented Feb. 11, 1969

3,427,617

SIGNAL TRANSMITTING AND RECEIVING SYSTEM

Donald Richman, Fresh Meadows, N.Y., assignor to Hazeltine Research, Inc., a corporation of Illinois Filed Apr. 21, 1959, Ser. No. 807,952
U.S. Cl. 343—17.2 12 Claims
Int. Cl. G01s *7/28, 9/42, 9/44*

This invention relates to a signal transmitting and receiving system having improved signal resolution and immunity to interference signals. In particular, it relates to a system that includes apparatus for transmitting a signal encoded in a novel configuration, and for receiving and decoding the signal so as to shape the received signal in a new and heretofore unobtainable manner.

One type of transmitting and receiving system contemplated by the present invention is a radar system in which the transmitted signal may take the form of pulses of radio wave energy. The transmitted pulse, upon encountering a target at some distance from the transmitter, is reflected and returns as an echo pulse to a receiver which may be located near the transmitter. The receiver may be adapted to determine, from the echo pulse, information relating to the target's radial velocity and distance (range) relative to the transmitter-receiver set. Radial velocity may be determined by comparing the wave frequency of the echo pulse with the known wave frequency of the transmitted pulse. The difference between the two is known as the Doppler frequency shift caused by the relative movement of the reflecting surface of the target. The frequency resolution of the system is a measure of the ability of the receiver to detect these frequency shifts. For a given receiver apparatus, frequency resolution is primarily a function of the bandwidth of the echo pulse, and improves as the bandwidth becomes narrower. There is an inverse relationship in a simple pulse between its bandwidth and its time duration, the longer the time duration, the narrower the bandwidth. Due to this inverse relationship the frequency resolution of the pulse can be said to be a function of the time duration of the pulse.

Target range is found by determining the time it takes for the transmitted pulse to travel out to the target and back to the receiver. Thus, the range resolution of a radar system depends on the ability of the receiver to determine the exact time position of the echo pulse relative to the time it was originally transmitted. Range resolution is, therefore, primarily a function of the bandwidth of the pulse, due to the interrelation between the time duration and bandwidth of the pulse; and the range resolution improves as the bandwidth broadens. Simultaneous enhancement of both frequency and time resolution is not compatible for simple pulses due to the constancy of the bandwidth time duration product at any given relative amplitude.

The ability of the receiver to detect the echo signal in the presence of interference signals, such as random noise and man-made jamming signals, depends to a great extent on its ability to discriminate, at the input circuits, between the actual echo signal and the interfering signals. The ideal input circuit, namely that portion of the receiver before the detector and indicator, would operate to accurately and reliably determine the presence of the echo signal by picking it out of the interfering signals and translating it to the detector at high amplitude levels, while either completely blocking translation of the interfering signals or else translating them at such low amplitude levels relative to the translated echo signal that the indicator would clearly show the distinction between the two. One known method of approximating this operation is to match the frequency and phase characteristics of the input circuits to those of the expected echo signal.

Heretofore, efforts have been made to improve the resolution and immunity to interference signals of transmitting and receiving systems and, in particular, radar systems. These efforts produced a system utilizing a signal coding technique known as pulse compression, whereby an encoding arrangement at the transmitter imparts a linear frequency modulation characteristic to the wave structure of the pulse. This permits the pulse to be transmitted with a long time duration and at low peak amplitude and to be reconstituted at the receiver in the matched input circuits as a narrow time pulse with a high peak amplitude. Some improved discrimination between the echo pulse and interference signals is achieved under certain conditions. However, this type of signal coding has not proven itself entirely satisfactory since it does not improve to any great extent the accuracy with which the pulse can simultaneously indicate the range and velocity of the target, that is, resolution in the frequency-time plane.

As has already been mentioned for simple pulses, of which linear pulse compression is a form, the constancy of area in the frequency-time plane precludes resolution enhancement. Further, the nature of this coding scheme is such as to introduce frequency-time ambiguity; that is, range becomes a function of target velocity and vice versa.

In order to obtain a simultaneous improvement in velocity and range resolution, radar systems have been developed that utilize a transmitted pulse coded at the transmitter to have noise-like properties. A system using this type of transmitted pulse can be shown to have a system response that will develop from an echo pulse a major return having a high peak amplitude and high resolution, i.e., a small bandwidth time-duration product, but that will also develop undesirable minor returns which may have peak amplitudes equal to or greater than the major return.

It is, therefore, an object of the present invention to provide a new and improved signal transmitting and receiving system that avoids the disadvantages and limitations of prior systems.

It is a major object of the present invention to provide a new and improved signal transmitting and receiving system with a unique system response having a single large magnitude high resolution major peak. The remainder of the system response falls off smoothly and sharply (monotonically decreasing).

It is another object of the present invention to provide a signal transmitting and receiving system that encodes the transmitted signal in a novel manner, thereby permitting accurate and reliable signal detection at the system receiver.

It is a further object of the present invention to provide a radar system having improved velocity and range resolution and having greater immunity to noise and jamming signals.

It is also an object of the present invention to provide a Sonar system with improved velocity and range resolution and immunity to interference signals.

It is still a further object of the present invention to provide any communication system with improved signal resolution, interference signal immunity, and excellent adjacent or overlapping channel rejection qualities.

In accordance with one form of the present invention, a signal transmitting and receiving system having a system response characterized by its improved resolution in frequency and time, and its immunity to interference signals comprises means for transmitting a wave signal coded with a cubic phase characteristic. The system also comprises means for receiving and translating a plurality of signals including the coded signal thereby to provide a high peak amplitude output signal for only those of the received signals having frequency and phase characteristics substantially the same as said coded signal.

For a better understanding of the present invention, together with other and further objects thereof, reference is had to the following description taken in connection with the accompanying drawings, and its scope will be pointed out in the appended claims.

Referring to the drawings:

FIG. 1 is a schematic diagram of a radar system embodying the present invention;

FIG. 1*a* is a circuit diagram of a conventional network useful in the FIG. 1 radar system;

FIG. 1*b* illustrates response curves useful in the description of the FIG. 1 radar system;

Figure 2:
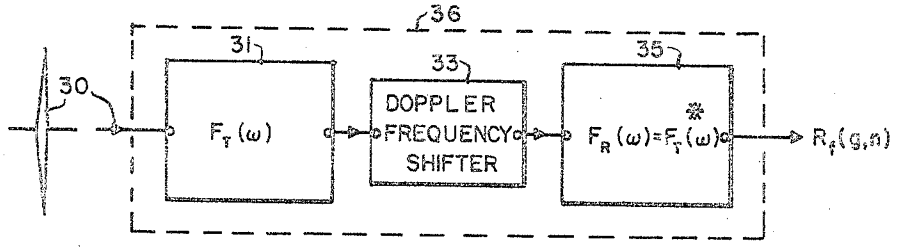
FIG. 2 is a simplified schematic diagram of the FIG. 1 radar system used in explaining the operation of the invention.
Figure 4:
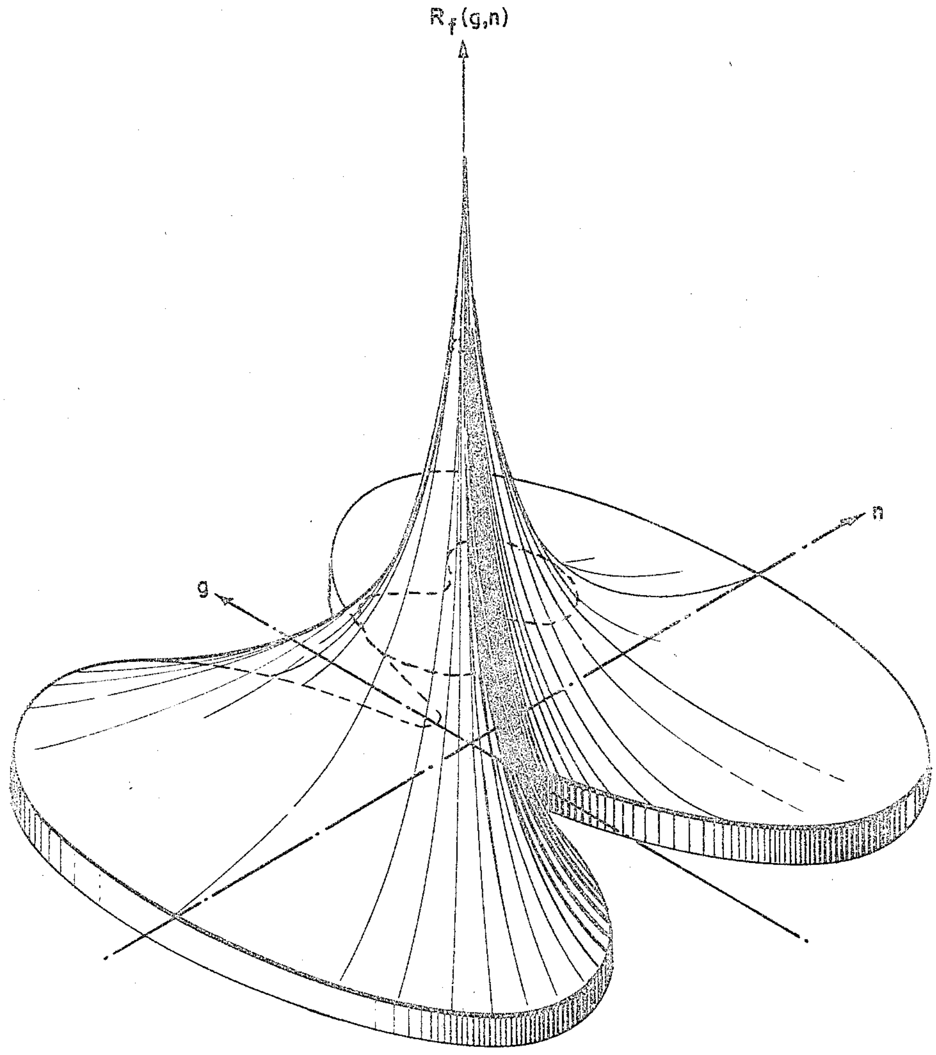
FIG. 4 is a three-dimensional representation of the FIG. 1 radar system response.
Figure 4B:
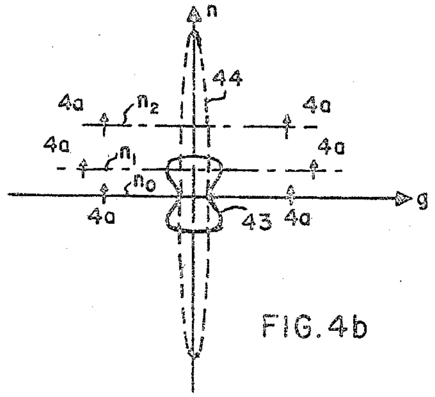
Figure 4C:
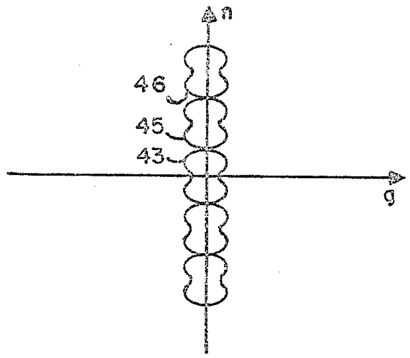
Figure 4A:
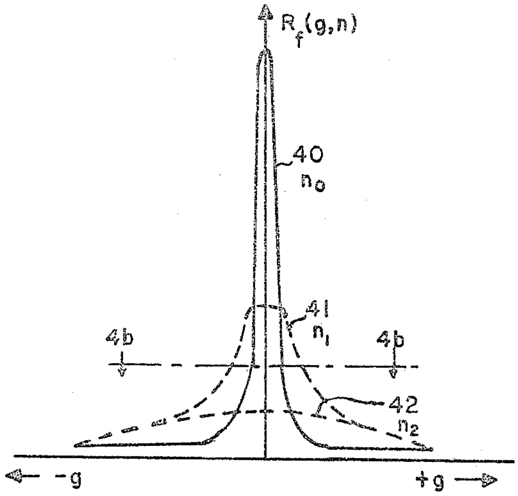
Figure 5:
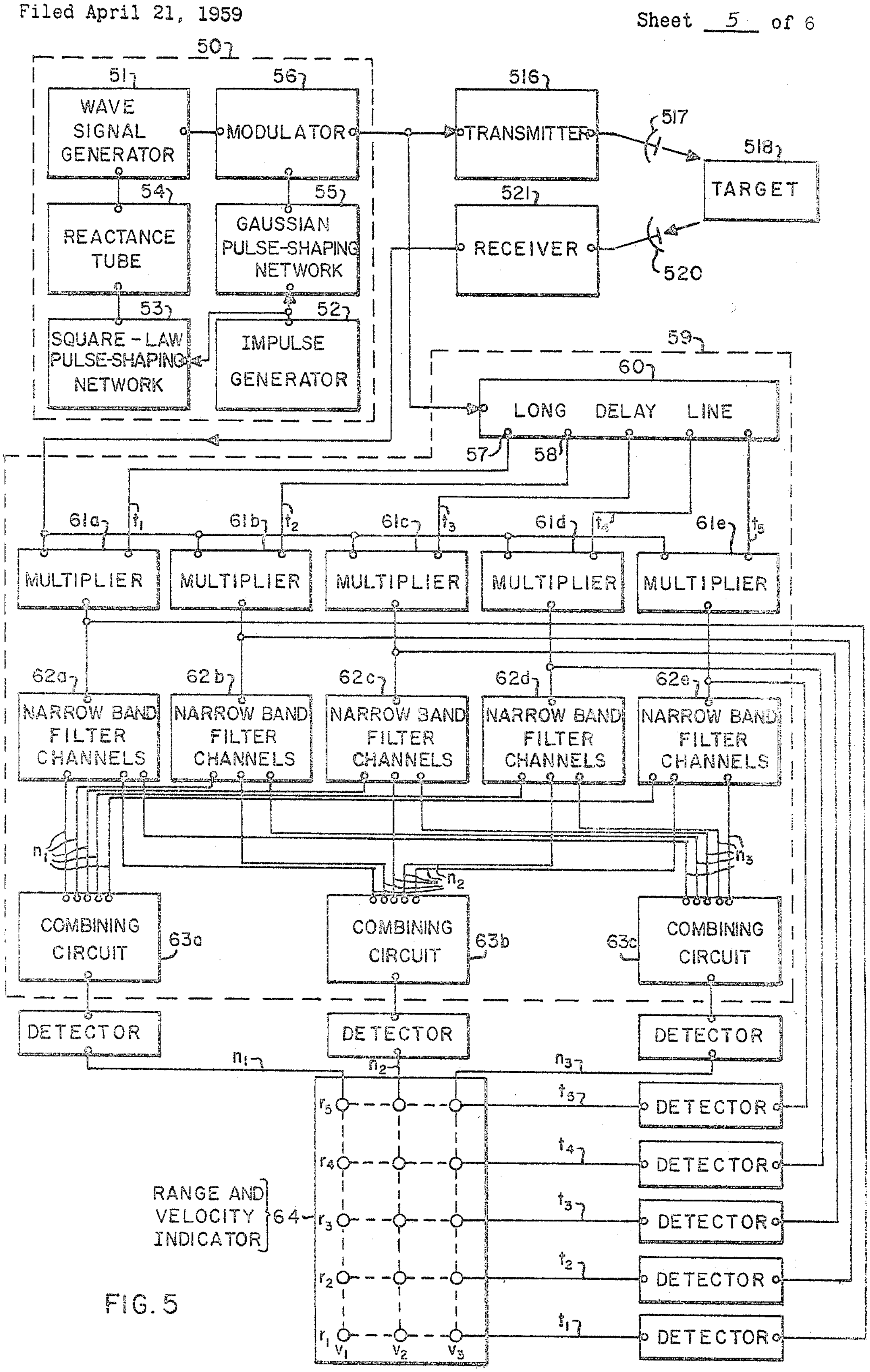
Figure 6:
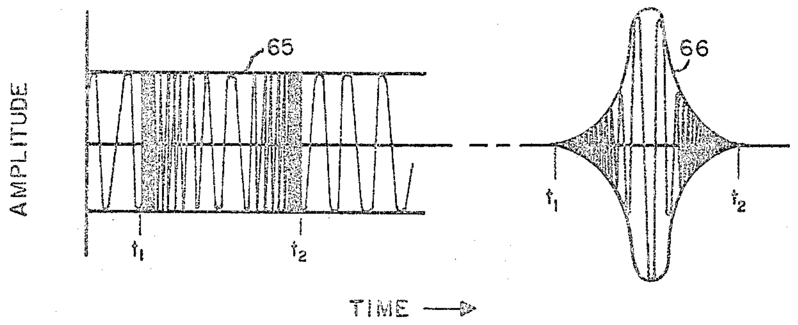
Figure 7:
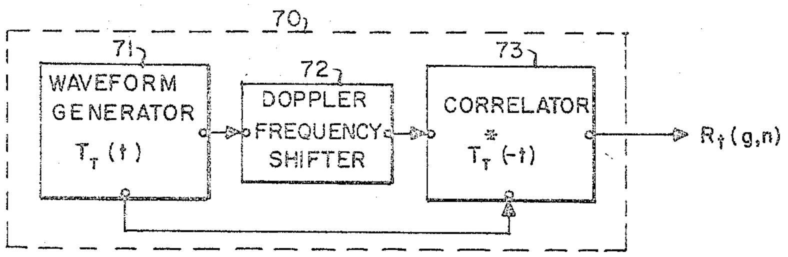

FIGS. 4*a* and 4*b* are side and plan views of the system response used in explaining the advantages of the invention;

FIG. 4*c* is a plan view of a system response in a system using multiple decoders;

FIG. 5 is a schematic diagram of a radar system embodying a different form of the invention;

FIG. 6 illustrates signal wave forms useful in explaining the operation of the FIG. 5 system, and FIG. 7 is a schematic diagram similar to that of FIG. 2 and used in explaining the operation of the FIG. 5 radar system.

DESCRIPTION OF FIG. 1 RADAR SYSTEM

Figures 1, 1A, 1B:
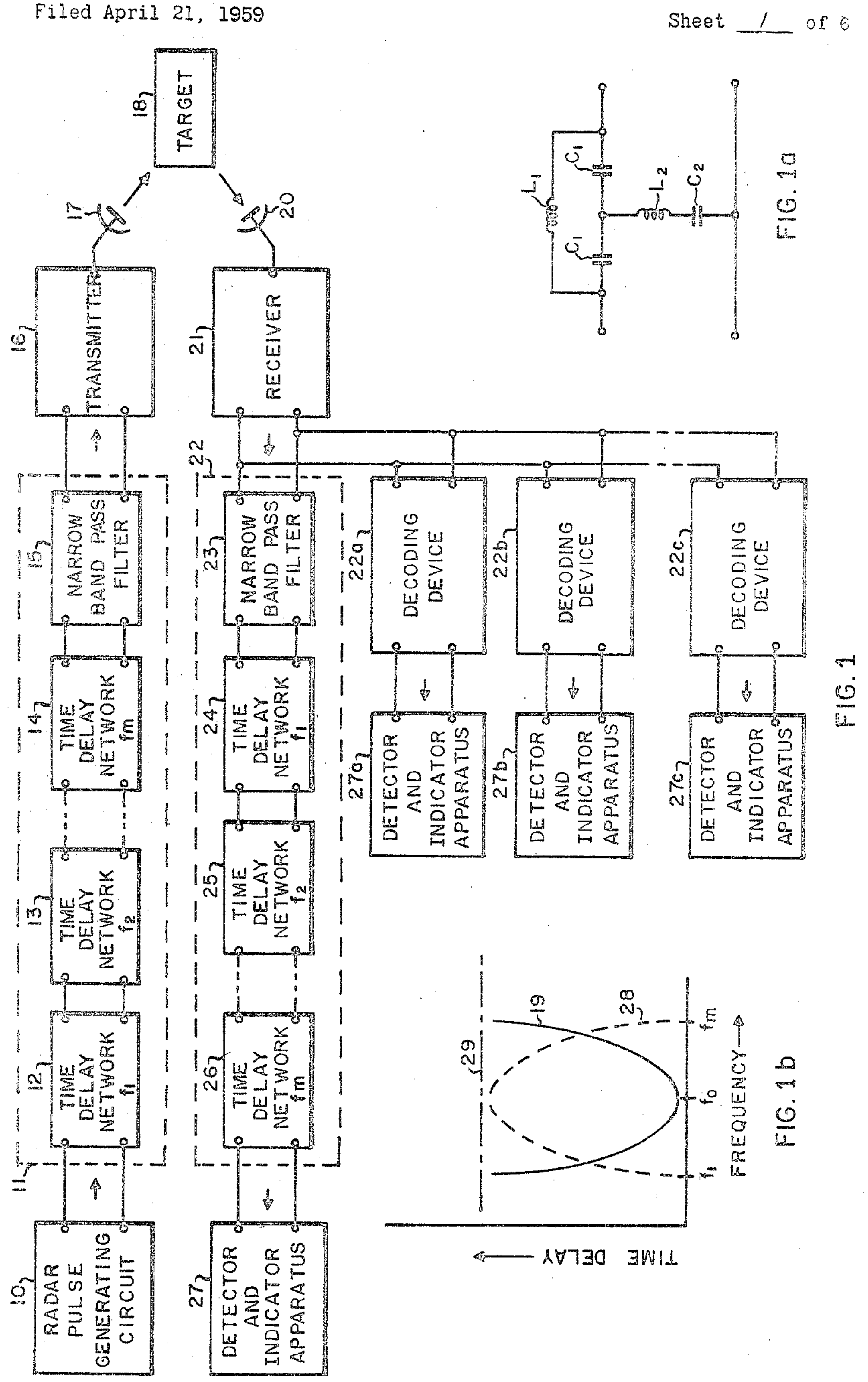

In FIG. 1 there is shown a signal transmitting and receiving system, namely, a radar system constructed in accordance with the present invention to have a system response characterized by its improved resolution in frequency and time, and its immunity to interference signals. The system comprises means for transmitting a signal which in this case is a radar pulse coded with a cubic phase characteristic. In the particular system illustrated, the cubic phase characteristic takes the form of square-law time delay versus frequency, as will be explained in greater detail subsequently. The transmitting means includes a conventional pulse generating circuit 10 for supplying at the output thereof a train of pulses comprising bursts of radio-frequency energy, for example, center about 3 megacycles, The pulse envelope may be of any convenient form. It will be understood by those skilled in the art that any given pulse in this supplied pulse train will have a determinable frequency spectrum having discrete frequency components encompassing the center frequency of 3 megacycles. The output of pulse generating circuit 10 is connected to the input of coding device 11 wherein the aforementioned cubic phase characteristic, in the form of square-law time delay, is imparted to the frequency spectrum within a desired range $f_1$ to $f_m$ as shown in FIG. 1*b*.

Coding device 11 includes time-delay networks 12–14, inclusive, coupled to the output of pulse generating circuit 10 in cascade arrangement. Although only three time-delay networks are shown, it will be understood that as many networks may be used as is necessary accurately to achieve the square-law time-delay characteristic, or at least to a reasonable approximation thereof. Each of networks 12–14, inclusive, may be a bridged-T network of the all-pass, constant K type as shown in FIG. 1*a*. The circuit parameters $L_1$, $C_1$, $L_2$ and $C_2$ are proportioned to translate therethrough all of the frequency spectrum of the supplied pulse with a particular small portion of the spectrum within the range $f_1$ to $f_m$, time delayed by an appropriate amount. Each succeeding network is designed to effect a predetermined amount of time delay on a different selected portion of the pulse frequency spectrum so that the total effect of networks 12–14, inclusive, is to impart an over-all square-law time delay versus frequency characteristic to the spectrum translated therethrough, as shown by curve 19 of FIG. 1*b*. The output of time-delay network 14, last in the cascade arrangement, is applied to a gaussian-like bandpass linear phase filter 15 which has a bandwidth response characteristic effectively to block translation of any frequency components not falling within the frequency range $f_1$ to $f_m$. The limits $f_1$ and $f_m$ of the spectrum are chosen to give the desired range resolution for the system.

The output of bandpass filter 15, where the pulse signal now appears in coded form, is connected to the input of transmitter 16, constructed in a conventional manner, to heterodyne the band of frequencies in the vicinity of 3 megacycles to a higher carrier frequency, for example, to radar frequencies, and to amplify the signal preparatory to transmission. Antenna 17 is coupled to transmitter 16 to propagate the signals in the usual manner toward target 18, whereupon the transmitted pulse is reflected as an echo pulse.

The radar system of FIG. 1 also comprises means for receiving and translating a plurality of signals including the coded echo pulse signal, thereby to provide a high peak-amplitude output signal from only those of the received signals having frequency and phase characteristics substantially the same as the coded signal. The receiving means includes antenna 20 coupled to the input of receiver 21 which is conventionally constructed to receive the transmitted signal after it has been reflected as an echo pulse, and to heterodyne the frequency thereof to some low band of frequencies in the range of, for example, 3 megacycles. Since receiver 21 has no means to discriminate between echo pulses and any other signals such as noise or jamming signals, the output of receiver 21 contains these other signals along with the echo pulse. The other signals may well have peak amplitudes greater than the echo pulse although their frequency and phase characteristics, in general, may not be exactly or even substantially the same as the echo pulse. The output of receiver 21 is coupled to the input of decoding device 22, wherein the received signals are processed to produce an output therefrom in response to signals having substantially the same frequency and phase characteristics as the coded signal.

For efficient decoding the response of device 22 would be designed to match the echo signal. That is to say, for decoding, the response of decoding device 22 is the conjugate of the frequency characteristic of the echo signal. The amplitude response is exactly the same as the shape of the echo pulse amplitude, while its phase or time-delay characteristic is the mirror image of that for the pulse. Where the echo pulse has the same amplitude, frequency, and phase characteristics as given to it by coding device 11, the response of decoding device 22 would then be the conjugate of the response of coding device 11, and is so designed in the FIG. 1 radar system. Decoding device 22, therefore, includes bandpass filter 23 having its input terminals connected to the output of receiver apparatus 21 and having a bandpass and amplitude response exactly the same as that of filter 15 in coding device 11. The output of filter 23 is then coupled to a cascade arrangement of time-delay networks 24–26, inclusive, which has an over-all time-delay response shown by curve 28 of FIG. 1*b* as being the inverse of time-delay characteristic 19. The output of network 26 is coupled to detector and indicator apparatus 27 which may include conventional circuits and apparatus to provide a visual indication of the information contained in a decoded signal.

The arrangement utilizing a signal decoding device 22 is sufficient to receive and decode an echo pulse from a stationary or slow moving target. When the transmitted pulse is reflected from a moving target, the relative motion of the target imparts a Doppler frequency shift to the pulse. Thus in this situation, decoding device 22, although it is matched to the transmitter filters in device 12, is not matched to the echo signal at the output of receiver 21 since the frequency spectrum of the echo pulse is shifted with respect to the transmitted spectrum. Therefore, in order that the FIG. 1 system may efficiently detect the echo pulse, and additionally indicate target radial velocity, a plurality of decoding devices 22*a*–22*c*, inclusive, must be provided with their respective response center frequencies offset by an amount determined by the response of the adjacent devices. For this purpose, decoding devices 22*a*–22*c*, inclusive, may be designed exactly the same as described with respect to device 22 with the exception of the offset center frequency. Each of devices 22*a*–22*c*, inclusive, may then be connected to individual detector and indicator systems 27*a*–27*c*, inclusive. The illustration of separate indicators is schematic in nature and not intended to suggest that only separate indicators be utilized since it is possible to use other arrangements, for example, a single indicator coupled to all of decoding devices 22*a*–22*c*, inclusive, and gated to sample their respective outputs in sequence or on a maximum likelihood basis.

EXPLANATION OF OPERATION OF FIG. 1 RADAR SYSTEM

Before considering the detailed operation of the FIG. 1 radar system it would be helpful first to consider the operation of the invention in terms of a generalized system as shown in FIG. 2. Referring now to FIG. 2, the system shown comprises a transmitter network 31 having an impulse frequency response $F_T(\omega)$. An impulse for the purpose of this description is a pulse having a very short time duration and an extremely broad frequency spectrum. The impulse frequency response of a network is the shaping effect the network has on the spectrum of an applied impulse. The output of transmitter network 31 is translated through Doppler frequency shifter 33 and applied to the input of receiver network 35 having an impulse frequency response $F_R(\omega)$ which is the complex conjugate of the response of transmitter network 31, $F_T^*(\omega)$. Network 31, frequency shifter 33, and network 35 may all be taken together and considered as a single composite system 36 having the system response junction, $R_f(g, n)$. Where the input to system 36 is an impulse, then the output $R_f(g, n)$ is the impulse response of system 36, or simply the system response.

Considering now the operation of system 36, it will be assumed that network 31 is designed to have an impulsive frequency response:

$$F_T(\omega)=e^{-\left(\frac{2}{W}\right)^2(\omega-\omega_0)^2}e^{jb(\omega-\omega_0)^3} \quad (1)$$

where:

$$e^{-\left(\frac{2}{W}\right)^2(\omega-\omega_0)^2}$$

is the notation which defines a frequency spectrum of bandwidth W centered at $\omega_0$ having a Gaussian amplitude response, $e^{jb(\omega-\omega_0)}$ is the complex representation for the cubic phase characteristic, and $b$ is a constant representing the amount of the cubic phase characteristic imparted to the signal.

Therefore, an impulse applied to network 31 is coded in a manner defined by Equation 1. This coded pulse is then translated through frequency shifter 33 where a frequency shift $n$ may be imparted to the pulse translated therethrough. The frequency shift $n$ may be zero, positive, or negative. At the output of shifter 33 the signal has the form:

$$F_T(\omega+n)=e^{-\left(\frac{2}{W}\right)^2(\omega-\omega_0+n)^2}e^{jb(\omega-\omega_0+n)^3} \quad (2)$$

The pulse output of shifter 33 is then applied to receiver network 35 having an impulsive frequency response, the conjugate of network 31, defined in corresponding complex form as follows:

$$F_R(\omega)=\begin{Bmatrix}\text{conjugate}\\ \text{of } F_T(\omega)\end{Bmatrix}=F_T^*(\omega)=e^{-\left(\frac{2}{W}\right)^2(\omega-\omega_0)^2}e^{-jb(\omega-\omega_0)^3} \quad (3)$$

It can be shown that the system response function, $Rf(g, n)$, is the Fourier transform of the frequency spectrum of the output of network 35, the output spectrum being the product of the impulsive frequency response, $F_R(\omega)$, times the frequency spectrum of the signal applied thertoe, $F_T(w+n)$. Mathematically, the system response function may be expressed as follows:

$$R_f(g, n)=\frac{1}{2\pi}\int_{-\infty}^{\infty}F_T(\omega+n)F_R(\omega)e^{j\omega g}d\omega \quad (4)$$

The parameter $g$ appearing in the integral is a time parameter that exists independently of real time $t$ and is a measure of the ouptut pulse's time duration. Since it is measured relative to the center of the pulse, it is possible to have values of $g$, in addition to zero, that are both positive and negative. Solving Equation 4 after substituting Equations 2 and 3 therein and then normalizing the result with respect to values $g$ and $n$ equal to zero, the system response of system 36 can be shown to be:

$$\left|\frac{R(g, n)}{R(o, o)}\right|=A^{-1/4}e^{-\frac{2n^2}{W^2}-\frac{g^2W^2}{32A}} \quad (5)$$

where $$A=\left[1+\left(\frac{3}{8}bW^2n\right)^2\right] \quad (6)$$

If a three-dimensional plot is made for Equation 5 for all values of $g$ and $n$, a surface as shown in FIG. 4 is derived.

Those skilled in the art of signal communications will immediately recognize the system response of FIG. 4 as being entirely unique and preferable to any such surfaces presently known to the art. Besides having a desirable single, large magnitude, high resolution major peak centered at $g=0$ and $n=0$, for absolute values of $g$ and/or $n$ increasing, the remainder of the system response function falls off smoothly (monotonically decreases) and sharply. That is, the skirts or side lobes of the surface representing the spectral response fall off rapidly and smoothly with no peaks or spikes thereon that might tend to create ambiguous returns. Thus, not only is the echo pulse peak accurately located within a very narrow range of frequency and time but also any received signals that do not have substantially the same frequency and phase characteristics as the coded pulse are effectively eliminated by being suppressed in amplitude and dispersed in time.

Referring again to FIG. 1, the operation of the illustrated radar system in achieving the system response of FIG. 4 will not be explained, while at the same time comparing it with the operation of the simplified schematic of the system 36. Pulse generator 10 supplies pulses (impulses) to coding device 11. To simplify the explanation, it will be assumed that the supplied pulse takes the form of an impulse, that is, a pulse having a very short time duration and having a spectrum band width very much greater than the band width of band-pass filter 15. Coding device 11 corresponds to the transmitter network 31 of FIG. 2 and has the same impulse frequency response as defined in Equation 1.

The cubic phase characteristic $e^{jb(\omega-\omega_0)3}$, which also may be expressed generally as $e^{j\phi(\omega)}$, is imparted to the signal by time-delay networks 12–14, inclusive. Since the phase characteristic is cubic, the time delay, $T_D(\omega)$, behaves as the square of the frequency difference, $(\omega-\omega_o)$, between the frequency of interest, $\omega$, and the center frequency, $\omega_o$. This results from the known fact that time delay is a measure of the rate of change in the phase imparted to a wave signal with respect to its frequency upon translation through a network:

$$T_D(\omega)\frac{d}{d\omega}=\phi(\omega)=\frac{d}{d\omega}b(\omega-\omega_o)^3=3b(\omega-\omega_o)^2 \quad (7)$$

where:

$\phi(\omega)$ is the phase shift imparted to a wave signal as a function of frequency.

Figure 3:
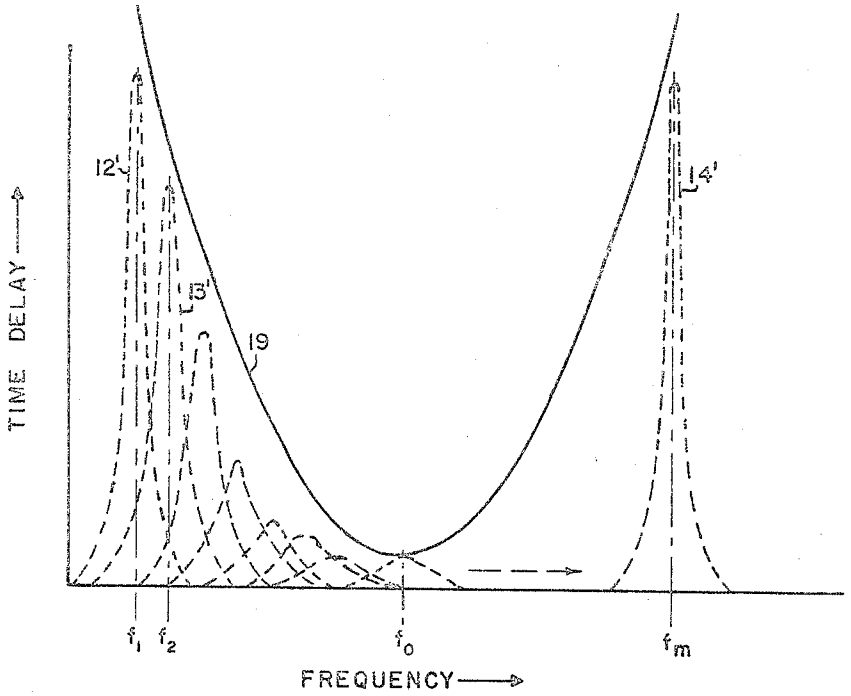
FIG. 3 illustrates, in greater detail, response curves similar to those of FIG. 1*b*.

The time-delay network as illustrated in FIG. 1*a* operates to translate all the frequency components applied thereto at constant amplitude. It also translates the signal with constant phase characteristics at all frequencies outside the particular region where a smooth phase reversal occurs. Within this phase-reversal region the phase change with respect to frequency causes a time delay which is illustrated by dotted curve 12' in FIG. 3. Network 13 has a time-delay characteristic illustrated by dotted curve 13'. The time delays 12' and 13' of the two networks 12 and 13 are cumulative in their effect on the translated pulse frequencies. By carefully designing the networks 12–14, inclusive, a reasonable approximation to a square-law time delay versus frequency characteristic, curve 19, is obtained. The desired amplitude response is imparted to the pulse spectrum by bandpass filter 15. The output of transmitter 16 is now in the form defined by Equation 1.

The pulse travels out from antenna 17 and is reflected toward antenna 20 by target 18 which corresponds to Doppler frequency shifter 33 of FIG. 2. This echo pulse is now in the form of Equation 2. If the target is stationary, then $n$ is zero, that is, the Doppler shift is zero, and the pulse remains in the same form as defined by Equation 1.

When the echo pulse is translated through decoding device 22, the action described above occurs as defined by Equation 4, to produce at the output thereof the signal having a form defined by Equation 5. It will be seen that the relative output for the specific case in which the target is stationary, i.e., when the frequency shift $n$ is zero, the normalized system response of Equation 5 then becomes:

$$\frac{R(g,0)}{R(0,0)}=e^{-\frac{(gW)^2}{32}} \quad (8)$$

This, when plotted for all values of $g$, gives curve 40 shown in FIG. 4*a*, which is the wave form to be seen on a conventional radar type A indicator, that is if the indicator were an oscilloscope swept in synchronism with the arrival of a pulse at antenna 20 horizontally in time and vertically in accordance with the amplitude of the output of decoder 22. At the same time, if the echo pulse translated through decoder 22 has a certain amount of Doppler frequency shift $n_1$ then the pulse, as it would be viewed at the oscilloscope, would be that as shown by curve 41 of FIG. 4*a*. Curve 42 is a similar trace of another pulse that has been shifted in frequency by an amount $n_2$ slightly greater than $n_1$ It can be seen by comparing FIG. 4 with FIG. 4*a* that the peak pulse amplitude drops sharply and the signal disperses in time for very small amounts of frequency shift $n$. As explained earlier, similar desirable results occur even for an interfering pulse having the same center frequency as when $n$ equals 0, but a phase characteristic other than the cubic phase characteristic of the coded pulse.

FIG. 4*b* is a plan view of the FIG. 4 system response surface with a cross section taken at the 1 napier level, i.e., the level equal to $1/e$ (the reciprocal of the base of the natural logarithm) of the peak response contour. The 1 napier level of another system utilizing a simple uncoded pulse is shown by dotted curve 44 for purposes of comparison. FIG. 4*c* shows a number of system responses 43, 44 and 46 contiguously arranged to provide continuous coverage over a number of Doppler frequencies without overlapping between adjacent channels.

Up to this point in the description it has been assumed that the FIG. 1 radar system is a Type F system, namely with the circuit parameters chosen so that the transmitted signal has the frequency spectrum defined by Equation 1. However, the system could equally as well be what is known as a Type T system, wherein the transmitted wave form would have its structure defined in terms of time $t$ as follows:

$$T_T(t)=e^{-at^2}e^{j(\omega_o t+ht^3)} \quad (9)$$

where:

$e^{-at^2}$ defines the shape of the envelope in time with its duration determined by the constant $a$, $e^{j\omega_o t}$ is the complex notation of the carrier frequency wave signal, and is equivalent to writing cos $\omega_0 t$, and $ht^3$ is the exponent denoting the cubic phase characteristic, the amount of which is determined by the constant $h$.

Since frequency is the rate of change of phase with respect to time:

$$\text{Frequency}=f=\frac{d\phi}{dt} \quad (10)$$

the cubic phase characteristic in this situation would be imparted to the transmitted signal as square-law frequency modulation. This follows from the derivative of the cubic phase characteristic:

$$\frac{d}{dt}ht^3=3ht^2 \quad (11)$$

The time-delay network parameters would, therefore, be chosen after determining the frequency spectrum of the signal of Equation 9 by means of the Fourier transform relation:

$$F(\omega)=\int_{-\infty}^{\infty}T(t)e^{-j\omega t}dt \quad (12)$$

However, it may be more convenient to utilize the Type T form of the invention in a system constructed in a manner which will now be described with reference to FIG. 5.

DESCRIPTION AND OPERATION OF FIG. 5 RADAR SYSTEM

The radar system shown in FIG. 5 comprises means for transmitting a signal having a predetermined frequency coded with a cubic phase characteristic. In particular, the transmitting means includes wave signal generator 51, which, in the absence of any control effect applied thereto, generates a signal at the aforesaid predetermined frequency, for example, at 3 megacycles. The arrangement for modulating the signal of generator 51 so as to code the signal with a cubic phase characteristic includes impulse generator 52 with the output thereof coupled to the input of square-law pulse-shaping network 53. The output of network 53 is then applied to reactance tube 54 to derive a control effect which, when applied to wave signal generator 51, operates to vary the frequency of the wave signal in generator 51 in a square-law manner as illustrated by curve 65 in FIG. 6. The output of generator 51 is connected to modulator 56 wherein pulse 66 in FIG. 6 is developed in the following manner. The output of impulse generator 52 is also applied to gaussian pulse-shaping network 55, wherein the impulse is shaped to have the gaussian form: $e^{-at^2}$, where $e$ is the natural logarithm base, $a$ is a constant, and $t$ is a real time parameter. This gaussian pulse is then applied to another input of modulator 56 in synchronism with the frequency-modulated portion of the wave signal to develop at the output of modulator 56 the pulse 66 having the cubic phase characteristic in the form of square-law frequency modulation. This signal is then applied to the input of transmitter 516 similar in construction to transmitter 16 of FIG. 1. The portion of the system within dotted box 50 will be hereinafter referred to as wave form generator 50. Pulse 66 is propagated by antenna 517 towards target 518 from which the transmitted pulse is reflected as an echo pulse having its frequency Doppler shifted by some amount, $n$, depending on the target velocity.

The FIG. 5 radar system also comprises means for receiving and decoding a plurality of signals including the Doppler frequency-shifted echo pulse which, for a stationary target, is the same as the transmitted coded pulse. The receiving means includes antenna 520 coupled to the input of receiver 521. The output of receiver 521 is then applied to a correlator circuit which includes the units enclosed within the dotted box 59. In particular the output of receiver 521 is connected to the inputs of a number of multiplier circuits 61$a$–61$e$, inclusive, conventionally constructed to compare two input signals in a manner to derive an output signal representative of the instantaneous product of the amplitude of the two input signals. To effect decoding operation in correlator 59, multipliers 61$a$–61$e$, inclusive, compare the incoming echo pulse with coded pulse 66 which is shunted from modulator 56 directly to the input of long delay line 60 in correlator 59. Delay line 60 has an electrical length equivalent to the maximum range of the radar system. A number of output terminals, for example, terminals 57, 58, are spaced along the delay line so that an echo pulse at the output of receiver 521 will coincide in time with the appearance of pulse 66 at one of the terminals. The corresponding multiplier then produces an output which is the product of the two input signals. It will be understood that although only five multipliers are shown, any appropriate number may be inserted up to a limit determined by the minimum allowable spacing between adjacent terminals on delay line 60. This minimum spacing is selected so that the trailing edge of pulse 66 disappears at one terminal at the same time the leading edge of pulse 66 begins appearing at the next succeeding terminal along the line. Due to the aforementioned relationship between the time duration and bandwidth of the pulse, the minimum spacing between terminals 57 and 58 will depend on the amount of frequency modulation imparted to the pulse at wave form generator 50.

Assuming that the echo pulse returns at time $t_1$ multiplier 61$a$ develops an output pulse at this time indicating the presense of a target at a certain range $r_1$. This output pulse is at a beat frequency equal to $n$, the amount of Doppler frequency shift. A simple detector connected to the output of the multiplier would be able to determine the time of occurrence of the pulse but would not be able to indicate at what value of Doppler frequency shift $n$ the pulse occurs. Due to this, the outputs of multipliers 61$a$–61$e$, inclusive, are individually coupled to units 62$a$–62$e$, inclusive, wherein the pulse energy is separated according to the Doppler frequuncy shift. Unit 62$a$, for example, consists of three narrow band filter circuits having a common input terminal thereof connected to the output of multiplier 61$a$ and having separate output connections to respective ones of circuits 63$a$–63$c$, inclusive. Units 62$b$, 62$c$, 62$d$, and 62$e$ are similarly constructed with outputs at the same Doppler frequency $n$ connected to individual inputs of combining circuits 63$a$–63$c$, inclusive. Circuits 63$a$–63$c$, inclusive, each may be a cathode follower matrix arrangement inserted therein to combine the signals without feeding them back to delay line 60. The outputs of circuits 63$a$–63$c$, inclusive, therefore include pulses at a certain Doppler frequency shift irrespective of the time of their occurrence and are coupled through conventional amplitude detectors to the velocity channels of range and velocity indicator 64. The outputs of multipliers 61$a$–61$e$, inclusive, are individually coupled through conventional amplitude detectors to the range channels of indicator 64. Thus the inputs to one side of indicator 64 depend on the time occurrence of the pulse while the inputs to the other side of indicator 64 depend on its frequency. Indicator 64 may then be arranged to produce a visible output at the particular channel intersection corresponding to the range of velocity of target 518. For example, a pulse output from multiplier 61$a$ at the Dopper frequency $n_2$ would cause an indication corresponding to range $r_1$ and velocity $v_2$.

The operation of the FIG. 5 radar system in terms of the present invention will now be explained with respect to the simplified schematic diagram of the system shown in FIG. 7. System 70 of FIG. 7 is similar to system 36 of FIG. 2 except that the circuit parameters of system 70 are chosen to translate a signal having certain defined time characteristics whereas, in system 36, the circuit parameters were chosen to translate a signal with certain defined frequency spectrum characteristics.

In system 70, wave form generator 71 has a wave form time response $T_T(t)$ as defined in Equation 9. Network 72 operates to Doppler frequency shift the signal from wave form generator 71. Network 73 has an impulse time response which is the conjugate of network 71, but due to the fact that network 73 now represents a correlator arrangement, the response is a conjugate of $(-t)$ as follows:

$$T_R(t)=T_T^*(-t)=e^{-at^2}e^{-j\omega_o(-t)}e^{-jh(-t)^3} \qquad (13)$$

A correlator effectively compares two input signals and indicates by an output signal the simultaneous presence of two similar input signals. Thus, the output of network 73 and, therefore, of system 70 is the correlation or product in time of the input signal from delay network 72 and a signal directly from network 71. The system response function $R_t(g, n)$ is the Fourier integral of this product:

$$R_t(g, n)=\int_{-\infty}^{\infty} T_T(t)T_R(t+g)e^{jnt}dt \qquad (14)$$

Looking at the opeartion of system 70, at real time $t_1$ when two signals are simultaneously applied to the inputs of network 73 the output thereof is determined by substituting Equations 9 and 13 in Equation 14. Solving Equation 14 and normalizing the result with respect to $R_t(0, 0)$:

$$\left|\frac{R_t(g, n)}{R_t(0, 0)}\right|=\left[1+\left(\frac{3h}{2a}g\right)^2\right]^{-1/4} e^{-\frac{ag^2}{2}-\frac{n^2}{8a\left[1+\left(\frac{3h}{2a}g\right)^2\right]}} \qquad (15)$$

A three dimensional plot of Equation 15 for all values of $g$ and $n$, would result in a system response surface the same as that shown in FIG. 4 except with the $g$ and $n$ axes interchanged. Thus, the improvement in frequency and time resolution (range-velocity resolution) obtained by using cubic phase distortion is seen to be achieved irrespective of whether the system uses a Type F signal or a Type T signal.

Now comparing the operation of system 70 to the radar system of FIG. 5, the apparatus within dashed box 50 corresponds to network 71 while the target 518 corresponds to Doppler frequency shifter 72, and the apparatus within dashed box 59 corresponds to network 73.

Referring now to FIG. 4$b$, the difference between the contour 44 of the response to a simple pulse and the contour 43 of the response to a signal transmitted with a cubic phase characteristic will now be considered with respect to the factor known as the compression ratio $r$. The compression ratio $r$ is the factor by which, in a Type F system, the maximum extent in $n$ is compressed when cubic phase modulation is utilized. In terms of the parameters $b$ and W as used in Equation 1, the compression ratio $r_f$ of a Type F system can be shown to be:

$$r_f = \frac{b}{3.45}\left(\frac{W}{2}\right)^3 \tag{16}$$

Correspondingly, in a Type T system the compression ratio $r_t$ in terms of parameters $a$ and $h$ can be shown to be:

$$r_t = \frac{1}{3.45}\left(\frac{h}{a^{3/2}}\right) \tag{17}$$

It will be readily apparent that although this invention has thus far been described in terms of its use in a radar system it also has use in other types of signal transmitting and receiving systems. For example, it may be used in a Sonar system where the signal transmitted is an acoustic signal usually in the audio-frequency range. The particular signal coding technique used will depend on the system and equipment requirements. Further, the invention is useful in any signal communication system either of the type utilizing analog modulated signals such as AM or FM radio broadcasting, or pulse-type communication signals.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A signal transmitting and receiving system having a system response characterized by a single lobe having monotonically decreasing sides, improved resolution in frequency and time, and immunity to interference signals comprising: means for transmitting a wave signal coded with a cubic phase characteristic; and means for receiving and decoding a plurality of signals including said coded signal, thereby to provide a high peak amplitude output signal from only those of said received signals having frequency and phase characteristics substantially the same as said coded signal.

2. A signal transmitting and receiving system having a system response characterized by a single lobe having monotonically decreasing sides, improved resolution in frequency and time, and immunity to interference signals comprising: means for transmitting a wave signal having a predetermined frequency spectrum coded with a square-law time delay versus frequency characteristics; and means for receiving and decoding a plurality of signals including said coded signal, thereby to provide a high peak amplitude output signal from only those of said received signals having frequency and phase characteristics substantially the same as said coded signal.

3. A signal transmitting and receiving system having a system response characterized by a single lobe having monotonically decreasing sides, improved resolution in frequency and time, and immunity to interference signals comprising: means for transmitting a wave signal coded with a square-law frequency modulation characteristic; and means for receiving and decoding a plurality of signals including said coded signal, thereby to provide a high peak amplitude output signal from only those of said received signals having frequency and phase characteristics substantially the same as said coded signal.

4. A radar system having a system response characterized by a single lobe having monotonically decreasing sides, improved resolution in range and velocity, and immunity to interference signals comprising: means for transmitting a pulse of radio-frequency energy coded with a cubic phase characteristic; and means for receiving and decoding a plurality of signals including said coded pulse, thereby to provide a single high peak amplitude output pulse from only those of said received signals having frequency and phase characteristics substantially the same as said coded pulse.

5. A radar system having a system response characterized by a single lobe having monotonically decreasing sides, improved resolution in range and velocity, and immunity to interference signals comprising: means for transmitting a pulse of radio-frequency energy having a predetermined frequency spectrum coded with a square-law time delay versus frequency characteristic; and means for receiving and decoding a plurality of signals including said coded pulse, thereby to provide a single high peak amplitude output pulse from only those of said received signals having frequency and phase characteristics substantially the same as said coded pulse.

6. A radar system having a system response characterized by a single lobe having monotonically decreasing sides, improved resolution in range and velocity, and immunity to interference signals comprising: means for transmitting a pulse of radio-frequency energy coded with a square-law frequency modulation characteristic; and means for receiving and decoding a plurality of signals including said coded pulse, thereby to provide a single high peak amplitude output pulse from only those of said received signals having frequency and phase characteristics substantially the same as said coded pulse.

7. A signal transmitting and receiving system having multiple system responses each characterized by a single lobe having monotonically decreasing sides, improved resolution in frequency and time, and immunity to interference signals comprising: means for transmitting pulses of radio-frequency energy coded with a cubic phase characteristic; and means including a plurality of decoding devices having individual response characteristics positioned about respectively different center frequencies for receiving and decoding a plurality of signals including said coded signal thereby to provide a high peak amplitude output signal from only those of said received signals having frequency and phase characteristics substantially the same as said coded signal and having substantially the same center frequency as any single one of the decoding devices.

8. A signal transmitting and receiving system having multiple system responses each characterized by a single lobe having monotonically decreasing sides, improved resolution in frequency and time, and immunity to interference signals comprising: means for transmitting pulses of radio-frequency energy coded with a cubic phase characteristic; and means including a plurality of decoding devices having individual response characteristics positioned about respectively different center frequencies, said center frequencies being selected to arrange said individual response characteristics in substantially contiguous relationship for receiving and decoding a plurality of signals including said coded signal thereby to provide a high peak amplitude output signal from only those of said received signals having frequency and phase characteristics substantially the same as said coded signal and having substantially the same center frequency as any single one of the decoding devices.

9. A Sonar system having a system response characterized by a single lobe having monotonically decreasing sides, improved resolution in range and velocity, and immunity to interference signals comprising: means for transmitting an acoustic wave signal coded with a cubic phase characteristic; and means for receiving and decoding a plurality of signals including said coded signal, thereby to provide a high peak amplitude output signal from only those of said received signals having frequency and phase characteristics substantially the same as said coded signal.

10. A signal communication system having a system response characterized by a single lobe having monotonically decreasing sides, improved resolution in frequency and time, and immunity to interference signals comprising: means for transmitting an analog modulated wave signal coded with a cubic phase characteristic; means for receiving and decoding a plurality of signals including said coded analog signal thereby to provide a high peak amplitude output signal from only those of said received signals having frequency and phase characteristics substantially the same as said coded analog signal.

11. A signal communication system having a system response characterized by a single lobe having monotonically decreasing sides, improved resolution in frequency and time, and immunity to interference signals comprising: means for transmitting a pulse-type communication signal coded with a cubic phase characteristic; means for receiving and decoding a plurality of signals including said coded pulse-type signal thereby to provide a high peak amplitude output signal from only those of said received signals having frequency and phase characteristics substantially the same as said coded pulse-type signal.

12. A radar system having a system response characterized by a single lobe having monotonically decreasing sides, improved resolution in range and velocity, and immunity to noise and jamming signals comprising: means for transmitting a pulse of radio frequency energy having a predetermined frequency spectrum encompassing a predetermined center frequency, said means including a pulse coding network having effectively a square-law time delay versus frequency signal-translating characteristic, said coding network including a cascade arrangement of individual time delay networks each having an appropriate time delay effect on a corresponding individual portion of the frequency spectrum and cumulative to produce said square-law time delay characteristic over a desired range of said frequency spectrum, said signal translating network also including a frequency bandpass network means for eliminating portions of said frequency spectrum outside the desired range; and means for receiving and decoding a plurality of signals including said transmitted pulse, said means including a decoding network with a time delay versus frequency signal-translating characteristic which is the inverse of the corresponding characteristic in the coding network thereby to develop a single, high peak-amplitude pulse from only those of said received signals having substantially the same square-law time delay characteristic and the same center frequency as said coded pulse.

References Cited

UNITED STATES PATENTS

| | | | |
|---|---|---|---|
| 2,624,876 | 1/1953 | Dicke | 343—17.1 |
| 2,678,997 | 5/1954 | Darlington | 333—70 |
| 2,753,448 | 7/1956 | Rines | 250—6.45 |

FOREIGN PATENTS

| | | |
|---|---|---|
| 604,429 | 7/1948 | Great Britain. |

RODNEY D. BENNETT, *Primary Examiner.*

CHARLES L. WHITHAM, *Assistant Examiner.*

U.S. Cl. X.R.

340—3; 343—7.7, 9